Figure 1:
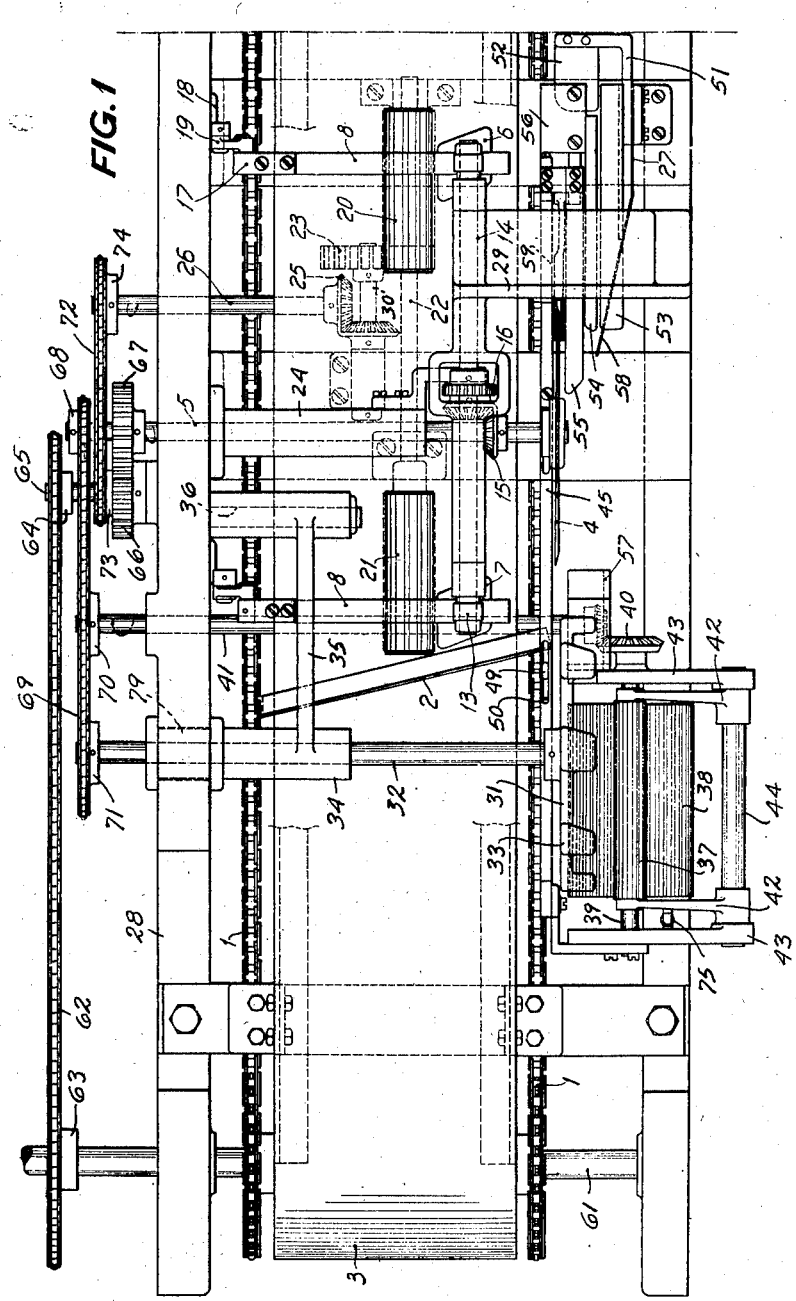

Nov. 27, 1951

P. DANIELSSON 2,576,215

FISH POSITIONING MACHINE

Filed July 3, 1947

3 Sheets-Sheet 1

Inventor
Paul Danielsson
by Sommers & Young
Attorneys

Nov. 27, 1951   P. DANIELSSON   2,576,215
FISH POSITIONING MACHINE

Filed July 3, 1947   3 Sheets-Sheet 3

Patented Nov. 27, 1951

2,576,215

UNITED STATES PATENT OFFICE 2,576,215

FISH POSITIONING MACHINE

Paul Danielsson, Stora Essingen, Sweden, assignor to Arenco Aktiebolag, Stockholm, Sweden, a Swedish joint-stock company Application July 3, 1947, Serial No. 758,953
In Sweden July 5, 1946

3 Claims. (Cl. 17—2)

This invention relates to improvements in fish dressing machines and more particularly to means for adjusting the fish longitudinally into correct positions relative to the means for dressing the fish, such as decapitating or eviscerating means. Such adjustment has hitherto been effected by mechanical or hydraulic driving means, such as a movable brush or a jet of water acting on the fish. Such means are, however, affected with certain drawbacks. The brush will be coated with slimy impurities so that it will rapidly be ineffective, and the use of a jet of water requires the arrangement of a pump and a supply of water.

It is an object of the invention to obviate these drawbacks by the provision of simple and effective means acting longitudinally of the fish and also transversely on the fish body to obtain the desired displacement. Another object of the invention consists in the provision of such means capable of accommodation to fish of considerably varying sizes.

With these and other objects in view, my invention consists of certain novel features of construction, combination and arrangement of parts, as will be hereinafter described and particularly set forth in the claims hereunto appened.

Figure 2:
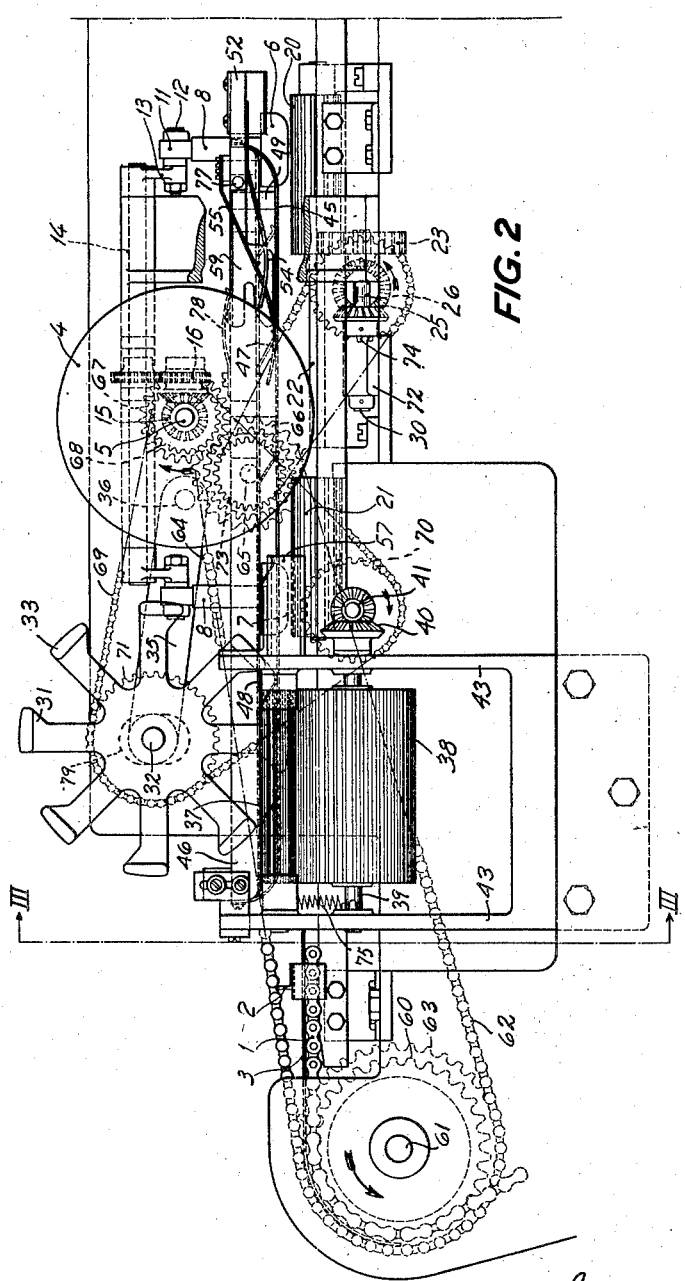
Figure 3:
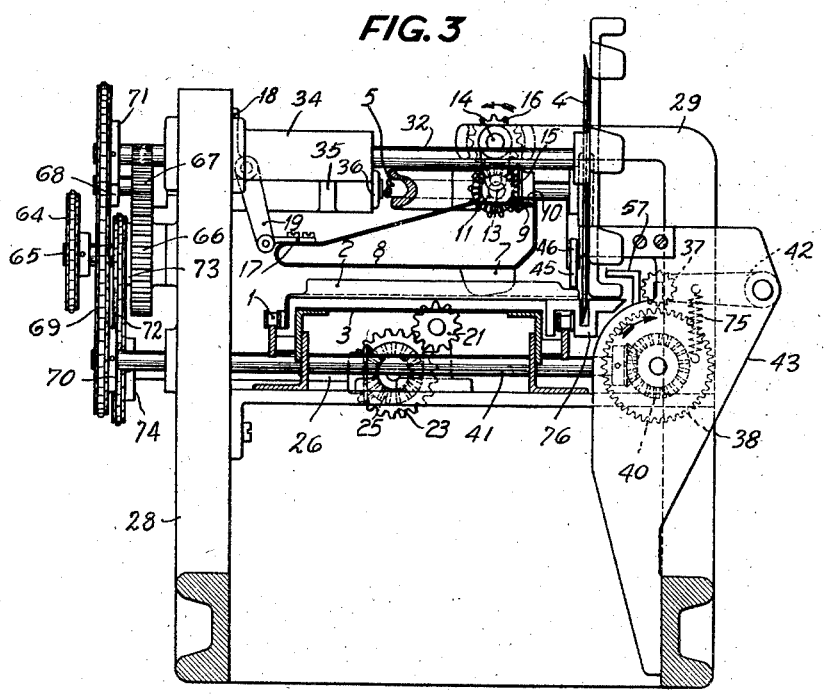

In the drawings:

Figs. 1 and 2 are a plan view and an elevational side view, respectively, of the fish dressing machine embodying the invention; and Fig. 3 is an elevational sectional view on the line III—III of Fig. 2.

Referring to the drawings, the machine has a fish conveyor consisting of a pair of endless chains 1 and obliquely disposed impellers 2 connected to the chains. To each impeller is secured a plate 76 for supporting the head of the fish. The fish are by the impellers 2 fed laterally upon a table 3 whereby they are decapitated by a circular cutter 4 secured to a shaft 5 which is rotatably journalled in a bracket 24 secured to the machine frame 28. In advance of and sequently to the cutter 4 are disposed press heads 6 and 7, respectively. Each press head is disposed above the table 3 and secured to a looped blade spring 8. Normally the ends 9 and 10 of each spring engage each other. The end 9 of each spring 8 is by means of a bracket 11 and a pin 12 pivotally connected to a crank 13. The cranks 13 are connected to opposite ends of a shaft 14 which is rotatably journalled in a standard 29. The shaft 5 drives the shaft 14 by means of a bevel gearing 15 and a spur gearing 16. The spring 8 is at its rear portion secured to a plate 17 which is pivoted to a link 19 and the link 19 is pivoted to a bracket 18 secured to the machine frame. On the rotation of the shaft 14 in the direction of the arrow (Fig. 3) the press heads 6 and 7 are moved in a circular path in said direction so that they will periodically engage a fish and move in the direction against gages 27 and 57 positioned at the same side of the conveyor as the cutter 4. Thereby the ends 9 and 10 of the spring 8 yield apart so that the press heads engage the fish yieldingly. Due to frictional resistance and the pressure exerted by the press heads upon the tapering rear portion of the fish the latter will be rapidly urged against the gages 27 and 57. The press heads 6 and 7 will due to their peculiar resilient connections to their driving means accommodate to fish of widely varying sizes and without materially varying pressure upon the body of the fish.

Rollers 20 and 21 secured to a rotary shaft 22 and having longitudinally extending flutings are disposed below the press heads 6 and 7, respectively and extend longitudinally of the fish conveyor. The roller 20 is by means of a fluted roller 23, a shaft 30 and a bevel gearing 25 driven by a shaft 26 so that both the rollers 20 and 21 rotate in a clockwise direction (Fig. 3). Thus, the roller 20 cooperates with the press head 6 pressing the fish against said roller to rapidly displace the fish against the gage 27 secured to a bracket 51. This displacement will be facilitated and accelerated by the oblique arrangement of the impellers 2. Thus, the push exerted by the oblique impellers on the fish sliding laterally upon the table 3 creates a component force in the direction against the abutment 27. An inclined plate 52 secured to the bracket 51 is adapted to guide the head of the fish below a horizontal plate 53 positioned at a level above the gage plate 27. Two resilient plates 54 and 55 secured to a bracket 56 are adapted to hold the fish heads in a proper vertical position when moving past a blade spring 58 forming an extension of the plate 27. The blade spring 58 is directed obliquely inwardly against a gage plate 59 extending longitudinally of the conveyor and embracing the cutter 4 at its front end and having a vertical bottom edge. The gage plate 59 is pivoted at 77 to the bracket 56 and a blade spring 78 is adapted to swing the plate 59 down into a position limited by abutments (not shown) on said plate and the bracket 56 so that an interspace is maintained between the head supporting plates 76 and the lower edge of the gage plate 59. The nose of the fish primarily having been moved into engagement with the gage plate 27 will when advancing slide laterally on the oblique blade spring 58 serving as a guide displacing the fish rearwardly, i. e. tail end first. Simultaneously, the fish is fed laterally below the plate 59 which can yield upwardly against the action of the spring 78. The fish will by the blade spring 58 be displaced rearwardly until its branchial arch abuts the bottom edge of the gage plate 59 arresting the fish. Thereafter the laterally advancing fish abutting the blade spring 58 will urge the spring 58 outwardly, i. e. away from interspace between the supporting plate 76 and the plate 59 until the fish leaves said spring. After thus having been adjusted longitudinally the fish will be decapitated in transit by the cutter 4. The decapitated fish will thereafter be displaced longitudinally by the press head 7 coacting in the same manner as the press head 6 with the roller 21 and the impellers 2 to move the fish against the gage 57.

Thereafter the fish is fed further into operative position relative to a press wheel 31 secured to a shaft 32 and provided with a plurality of press heads 33. The shaft 32 is rotatably journalled in a hub 34 formed integrally with an arm 35 which is pivotally mounted on a spindle 36 secured to the machine frame 28. The hub 34 is movable transversely in a slot 79 in the frame 28. The press wheel 31 operates in the same manner as that disclosed in my U. S. Patent No. 2,322,831. Thus, it squeezes part of the entrails out of the cut head end of the fish and the entrails are introduced into the bite between a pair of longitudinally fluted eviscerating rollers 37 and 38 arranged and operating in the manner as disclosed in my U. S. Patent No. 2,322,831. The roller 38 is secured to a shaft 39 which is rotatably journalled in standards 43 forming part of the machine frame. The shaft 39 is by means of a bevel gear 40 driven by a shaft 41 which is rotatably journalled in the machine frame. The roller 37 is freely rotatably mounted on arms 42 secured to a spindle 44 which is rotatably journalled in the standards 43. The roller is urged against the roller 38 by a tension spring 75 interconnecting one of the standards 43 and one of the arms 42.

During their passage from the press head 6 and further past the eviscerating rollers 37 and 38 the fish is subjected to downward pressure by a thin blade spring 45. The spring 45 extends longitudinally of the conveyor 1 and serves to prevent undesired longitudinal displacement of the fish and also to prevent that the fish bounces off the gage plate 27 when the nose of the fish hits said plate. The spring 45 is at both its ends secured to a vertically adjustable bar 46 and it consists of a plurality of sections that yield upwardly and partly independently of each other. Thus, a series of equidistant and inclined blade springs 47 are secured to the spring 45. The upper ends of the springs 47 project into a longitudinal groove 48 in the bar 46 and engage the bottom of said groove in which they can slide longitudinally. For guiding the spring 45 laterally it is also provided with upstanding pins 49 which are movable up and down in slots 50 in the bar 46.

The conveyor chains 1 run over sprockets 60 secured to a driving shaft 61. A chain 62 runs over another sprocket 63 secured to the shaft 61 and also over a sprocket 64 secured to a shaft 65 which is rotatably journalled in the machine frame. To the shaft 65 is secured a gear wheel 66 which meshes with a gear wheel 67 which is secured to the shaft 5. To the shaft 5 is also secured a sprocket 68 which drives a chain 69. The chain 69 runs over a sprocket 70 secured to the shaft 41 and over another sprocket 71 secured to the shaft 32. A chain 72 runs over a sprocket 73 secured to the shaft 65 and over another sprocket 74 secured to the shaft 26. By this transmission system all the motions of the various members as described hereinbefore will be accomplished.

I claim:

1. In a fish treating machine, a conveyor for feeding the fish laterally, a press head disposed above said conveyor, driving means for moving said press head in an endless path extending transversely of the fish feeding direction, and a looped spring interconnecting said driving means and said press head and having two ends adapted to normally engage each other and to yield apart to cause said press head to yieldingly engage the fish when moving through the lower portion of its endless path to displace the fish longitudinally by friction and by pushing and by jamming over a tapered portion of the body of the fish.

2. In a fish treating machine, a conveyor for feeding the fish laterally, a roller disposed longitudinally of said conveyor and adapted to support the fish in transit, driving means for rotating said roller to displace the fish longitudinally, a press head disposed above said conveyor and said roller, and driving means for moving said press head in an endless path in a plane extending transversely of said roller, said press head being yieldingly connected to said driving means to yieldingly engage and press the fish against said roller when moving through the lower portion of its endless path, the driving means of said roller and said press head being adapted to cause said roller and said press head to coact for displacing the fish longitudinally by friction and by pushing and by jamming over a tapered portion of the body of the fish.

3. In a fish treating machine, a conveyor for feeding the fish laterally, a press head disposed above said conveyor, driving means for moving said press head in an endless path extending transversely of the fish feeding direction, an abutment rigid with said driving means, and a looped spring interconnecting said driving means and said press head and having a free end adapted to normally engage said abutment and to yield away from said abutment to cause said press head to yieldingly engage the fish when moving through the lower portion of its endless path to displace the fish longitudinally by friction and by pushing and by jamming over a tapered portion of the body of the fish.

PAUL DANIELSSON.

REFERENCES CITED

The following references are of record in the file of this patent:

UNITED STATES PATENTS

| Number | Name | Date |
| --- | --- | --- |
| 1,909,643 | Waugh | May 16, 1933 |
| 2,245,330 | Danielsson | June 10, 1941 |
| 2,437,081 | Danielsson | Mar. 2, 1948 |
| 2,507,808 | Oates | May 16, 1950 |
| 2,507,810 | Oates | May 16, 1950 |